United States Patent Office 2,703,192
Patented Mar. 1, 1955

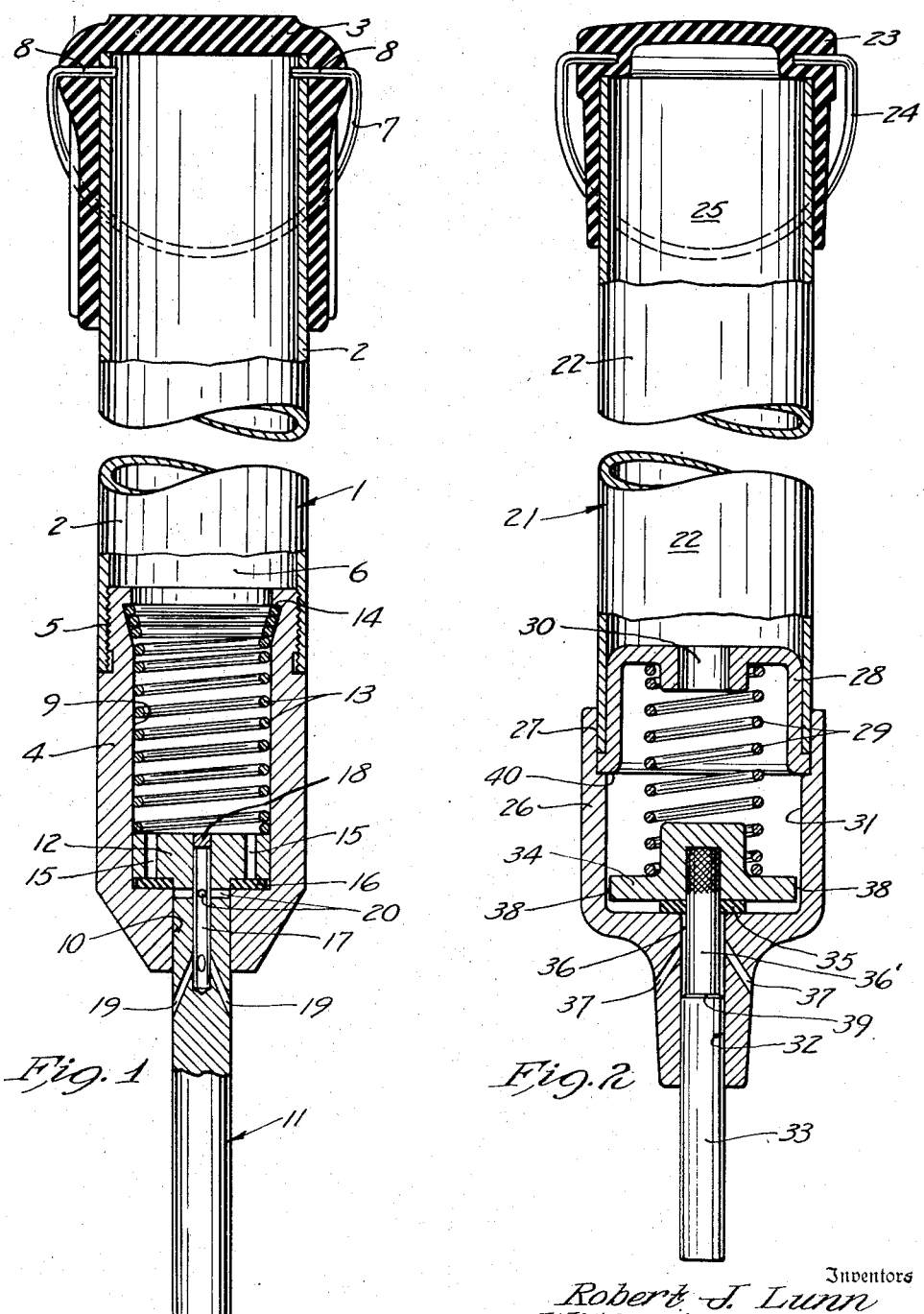

2,703,192

DISPENSER AND APPLICATOR FOR LIQUID WEED EXTERMINATORS

Robert J. Lunn and Wilfred W. Lowther, St. Paul, Minn., assignors to Donaldson Company, Inc., St. Paul, Minn., a corporation of Delaware Original application February 5, 1951, Serial No. 209,381. Divided and this application February 15, 1952, Serial No. 273,027

3 Claims. (Cl. 222—318)

Our invention relates to improvements in devices for dispensing weed exterminating liquids and applying the same to undesirable lawn weeds, particularly those of the broad leaf variety, such as dandelion, plantain, chickweed and the like. It is an established fact that such lawn weeds can very effectively be controlled by application thereto of the chemical 2,4-D, dichlorophenoxyacetic acid. In controlled solution, this chemical is a growth stimulant, but in greater concentration, it causes such rapid growth that the plant root system bursts and the plant dies. For effective extermination, this chemical is mixed with water and applied directly to the leaf surfaces of the lawn weeds. Actually, the chemical 2,4-D, in sufficiently concentrated solution to kill undesirable broad leaf weed plants, will also destroy most any other plants or grass with which it comes in contact, and as a consequence, effective control of undesirable weed plants requires localized or controlled application.

In view of the above, it is an object of the invention to provide an improved device of the class described whereby accurately controlled measured quantities of weed-destroying liquid may be locally applied, quickly and easily, to undesirable lawn weeds or plants with a minimum of injury to desirable plant life, such as domestic grass, clover and the like.

Another important object of the invention is the provision of a device of the class described, involving a liquid reservoir for storage of the weed exterminating liquid or the like and a pump mechanism for controlled dispensing of the liquid, of an improved construction whereby leakage or seepage of the stored liquid, during idle periods of the device, is eliminated. In this connection, it may be said that our invention provides simple and effective means whereby the liquid reservoir of the device is automatically sealed against leakage or seepage of the contained liquid during idle periods of the device, so that a relatively large quantity of a suitable weed exterminating liquid or the like may be stored in the device for long periods without loss.

Another important objective of the invention is the provision of simple and inexpensive means for accomplishing the important objective, last above noted, without resorting to costly close-working tolerances of the movable parts.

Other objectives of the invention are the provision of a device of the class described, which is highly efficient in operation, is very convenient to use, has a minimum of parts, has exceptionally long life and can be produced at a very low cost.

This application is a division of our co-pending application, Serial No. 209,381, filed February 5, 1951.

The above and other highly important objects and advantages of the invention will be made apparent from the following specification, claims and appended drawing.

In the accompanying drawing, like characters indicate like parts.

Referring to the drawings:

Fig. 1 is a view in side elevation, with some parts in section and some parts broken away, of a preferred form of the invention; and Fig. 2 is also a view in side elevation, with some parts broken away, but illustrating a somewhat modified form of the invention.

Description of Fig. 1

The main body of the device of Fig. 1 is in the nature of an elongated cylinder, indicated as an entirety by 1. Preferably and as shown, this tubular body 1 comprises an elongated tubular shell 2 that is normally closed at its upper end by a readily displaceable cap 3 and at its lower end by a supplemental body section 4, which is rigidly anchored to the section 2 by screw threads or the like, as shown at 5. The axial bore of the elongated tubular section 2 of the body 1 serves as a reservoir 6 for weed exterminating liquid, such, for example, as 2,4-D, dichlorophenoxyacetic acid, which may be supplied through the upper end of the body 1 upon removal of the displaceable cap 3. Preferably, and as shown, the displaceable cap section 3 is in the nature of an inverted cup of synthetic rubber or the like, which is telescopically applied over the otherwise open end of the section 2 and is displaceably locked in position by means of a spring wire bail 7, the trunnion-like ends 8 of which pass through aligned apertures in the cap 3 and the upper end of the tubular body section 2. The bail 7 serves as a convenient means for hanging the device and is merely spread sufficiently to withdraw the inturned ends 8 thereof from the tubular body 2 to allow displacement or application of the cap section 3.

The supplemental body section 4 has an axial bore 9, which serves as a pump cylinder and is closed at its outer end and has its inner end in receiving communication with the axially aligned bore 6 of the body section 2. The closed bottom end of the supplemental body section 4 is provided with an axial plunger bore 10, which is of reduced diameter with respect to the cylinder 9. An actuating plunger 11 works slidably through the bore 10 and carries at its inner end an expanded head 12, which serves as, and may be hereinafter referred to as, a pump piston. The pump piston 12 has normal free working clearance with the cylinder bore 9 and is normally yieldingly urged or biased downwardly to the extreme lower position shown in Fig. 1 by means of a coil compression spring 13 having one end seated against the piston 12 and its other or upper end seated against an inturned flange or shoulder 14 of the body section 4.

In this embodiment of the invention, the piston 12 is provided with a circumferentially-spaced series of restricted flow passages or apertures 15 extending therethrough to provide communication between the spaces above and below the piston 12, the lower ends of these passages 15 being disposed radially outwardly of the plunger 11. A resilient annular valve element 16 is disposed immediately adjacent the undersurface of the piston 12 and is fixedly secured on the plunger 11 so as to move therewith and the piston 12. It will be understood, however, that this resilient valve element 16 is free of the piston 12 so that it is free to flex upwardly and downwardly with respect thereto. In the preferred embodiment of the invention illustrated, the resilient valve element 16 is in the nature of an axially perforated disc of rubber, synthetic rubber or the like, and is held or secured fast on the plunger 11 by friction engagement therewith through its own resilience or elasticity. In other words, the central aperture or perforation of the resilient flexible and elastic valve element 16 is of less diameter than the plunger 11, so that a slight stretching of said valve element 16 is required to apply the same onto the plunger.

The upper end portion of the plunger 11 is provided with a central axial discharge bore 17, which is closed at its upper end at 18 and communicates at its lower end with a circumferentially-spaced series of downwardly and outwardly directed final discharge orifices 19. The upper end portion of the axial flow orifice discharge passage 17 communicates with a circumferentially-spaced series of radial fluid intake passages 20, which, when the piston 12 is in its normal extreme lower position shown, open into the upper end portion of plunger bore 10 just below the plane of the resilient valve element 16.

With this arrangement, upward movements of the plunger 11 and piston 12 will be limited to a position wherein the discharge ends of the downwardly and outwardly directed final discharge passages 19 are closed by being withdrawn slightly into the lower end of the plunger bore 10. Hence, with this arrangement, the cylinder space below the piston 12 and yielding valve seal 16 will be automatically closed against downward discharge during periods when the piston 12 is in its extreme upper positions, so that there will be no appreciable loss of fluid under these conditions.

Operation of Fig. 1

When the piston 12 and plunger 11 are in their normal extended positions of Fig. 1, the resilient valve element 16 is compressed between the piston 12 and the closed end of the body section 4 and serves as a yielding valve seal completely cutting off passage of fluid through the piston passages or orifices 15. Obviously then, in this position of the parts, there can be no seepage of fluid from the reservoir 6. The operator carries the device much like a walking stick or cane. When he comes onto an undesirable weed or plant in a lawn or the like, he places the end of the plunger 11 over the stem or center portion of that plant and then exerts sufficient pressure on the upper end of the tubular body 1 to retract the piston 12 against the action of the yielding means or spring 13. During such upward or retracting movements of the piston 12, the pressure of the fluid in the reservoir 6 will be exerted against the yielding valve disc 16 and cause the same to flex downwardly and permit fluid to flow thereby into the space in cylinder bore 9 below the piston 12. As soon as the piston 12 has been retracted, the operator will relieve the downward pressure on the tubular body 1 and permit the plunger-equipped piston 12 to be returned to its normal bottom position under the yielding action of spring 13. During this return or relative downward movement of the piston 12, with respect to the tubular body 1, the pressure below the resilient valve element 16, which now acts as a flap valve, will be greater than the pressure thereabove and will cause the said flap valve 16 to be pressed against the bottom of piston 12 and close off the passages 15, causing fluid to be ejected through the flow passages 20, 17 and 19. The fluid discharged from the downwardly and outwardly-directed circumferentially-spaced passages or orifices 19 will issue forth as a spray from each said orifice 19 to collectively produce a circular spray pattern concentric with the axis of plunger 11. The overall spray pattern thus produced will be of sufficient overall diameter to assure ample wetting of the selected plant or weed to assure destruction thereof, but will be sufficiently confined to prevent material damage to the associated lawn grass, clover or the like. Of course, when the piston 12 again reaches its bottom extended position of the drawings, the valve disc 16 will again be compressed between the piston and the end of the cylinder 9 to completely isolate the reservoir 6 from the discharge orifices or passages 20. (In the device illustrated, no special means of venting the reservoir 6 to atmosphere has been shown, since it is assumed that there will be sufficient air leakage past the cap 3 to amply vent the reservoir to atmosphere.)

The device illustrated in Fig. 1 may be made of any suitable metal or plastic material, but was particularly designed for fabrication for metal. When made of metal, it is desirable to make all metallic parts of the same metal, since the chemical 2,4-D and some other weed destroying agents may set up electrolytic action between dissimilar metals, which may produce a rapid corrosion and consequent deterioration. Preferably, all of the elements of the device shown in Fig. 1, with the exception of the cap 3 and the spring 13, are made of aluminum, and the spring 13 is made of spring steel cadmium plated for protection.

Description of Fig. 2

The modified device of Fig. 2 may also be made from any suitable material, but was particularly designed for fabrication largely from plastic parts, which may be inexpensively produced and is not subject to attack by chemical agents contemplated. The elongated tubular body of the device of Fig. 2 is indicated as an entirety by 21 and comprises an elongated tubular plastic shell 22 that is normally closed at its top by a displaceable plastic cap 23, equipped with a suitable bail 24. No special means has been shown for detachably anchoring the cap 23 to the tubular shell 22, but this may be accomplished by any suitable means, such as friction fit, screw threads, bayonet pins and slots, or other well-known means, allowing removal of the cap 23 for filling of the reservoir space 25 provided by the bore of shell section 22. The lower end of the tubular shell section 22 is closed by a supplemental shell section 26, which may also be of suitable plastic material and may be assumed to be permanently secured in telescopic engagement with shell section 22 by suitable cement or the like at 27. Disposed in the lower portion of shell section 22 is an inverted cup-like element 28, which serves as a base of reaction or seat for a coil compression spring 29 and is provided with a relatively large axial passage 30. The axial bore 31 of the supplemental shell section 26 provides a pump cylinder. The closed outer end of shell section 26 is provided with an axial plunger bore 32 of greatly reduced diameter with respect to that of the cylinder bore 31. Working slidably through this plunger bore 32 is a plunger 33, which may be made of any suitable material, but will preferably be metallic and may be assumed to be of aluminum. The plunger 33 is provided at its inner end with a fixed head serving as a piston 34. In this form of the invention, there are no special passages, such as shown at 15 in Fig. 1, through the piston. However, suitable flow communication between the upper and lower sides of the piston 34, during relative upward retracting movements of the said piston 34, is provided by a somewhat increased clearance between the perimeter of piston 34 and the inner surface of cylinder 31. The piston 34 is yieldingly urged or biased toward its intended position of Fig. 2 by the compression spring 29, which is interposed therebetween and the inverted cup-shaped element 28.

In the form of the invention shown in Fig. 2, a resilient valve element or seal 35 is provided and which is similar to the valve element 16 of Fig. 1 and is likewise anchored fast on the plunger 33 and lies flat against the undersurface of piston 34. To allow discharge of fluid from the cylinder 31, we reduce the diameter of the upper portion of plunger 33, with respect to the plunger bore 32, so as to provide an annular flow passage 36 which communicates with a circumferentially-spaced series of downwardly and outwardly directed final discharge orifices or passages 37, which produce a spray pattern corresponding to the spray pattern produced by discharge through the orifices 19 of Fig. 1. In Fig. 2, the reduced diameter portion of the plunger 33, defining the inner wall of annular passage 36, is indicated by 36' and terminates at its lower end in a shoulder 39 joining the same to the maximum diameter portion of the plunger 33. In the arrangement of Fig. 2, upward charging movements of the piston 34 and plunger 33 are limited by engagement of piston 34 with a stop shoulder 40; the design being such that the inner ends of the final discharge passages 37 will be covered and closed by the maximum diameter portion of the plunger 33 when the piston is in its said upper extreme position against stop shoulder 40, so as to prevent downward discharge of fluid when the piston is in its said upper position.

Operation of Fig. 2

The manner of operation of the device of Fig. 2 is identical to that described in connection with Fig. 1, insofar as handling by the operator is concerned. However, when the piston 34 of Fig. 2 partakes of relative upward movement with respect to the tubular body 21, the flow of fluid from the space above to the space below the piston 34 will be around, rather than through, the piston 34 and will be sufficiently rapid to completely fill the space below the piston 34 under normal relatively slow upward movements of the piston 34 under manual pressure. However, when manual pressure is released, the spring 29 will take over and move the piston 34 downwardly with sufficient speed to produce ample discharge pressure below the piston 34, even in the presence of considerable backflow through the generally annular flow passage clearance 38 between the piston 34 and cylinder bore 31. In other words, the pump will be designed to produce the desired volumetric discharge through passages 36 and 37 in the presence of the predetermined backflow past piston 34. During return strokes of the piston 34 under the action of spring 29, fluid will be discharged from orifices 37 onto the leaves of the offending plant or weed exactly as described in connection with Fig. 1. Of course, when the piston 34 reaches the bottom of its stroke, the valve element or seal 35 will be compressed between the piston 34 and the closed end of shell element 26 and will positively cut off flow through the annular passage 36 and circumferentially-spaced discharge passages 37.

Our invention has been thoroughly tested and found to be completely satisfactory for the accomplishment of the objectives set forth; and while we have shown a commercial embodiment of our improved device it will be understood that the same is capable of modification without departure from the scope and spirit of the invention as defined in the claims.

What we claim is:

1. In a liquid dispenser, an elongated tubular body member, one end of said member defining a liquid reservoir and the other end thereof defining a pump cylinder, an axial passage providing continuous communication between said reservoir and said pump cylinder, said other end of said body member terminating in a reduced elongated tubular portion having an axially disposed plunger bore therein, a plunger having a reduced inner end of less diameter than its outer end slidably mounted in said plunger bore and working between an inner closure position, and an outer closure position, said reduced inner end providing an annular space between said inner end and said plunger bore, a pump piston head fixed to the reduced diameter inner end of said plunger and disposed within said pump cylinder, said piston head being of substantially less diameter than the diameter of the pump cylinder providing a flow passage between the inner and outer pump cylinder chambers on opposite sides of the piston head during the working movements thereof, a generally outwardly directed restricted discharge passage communicating with said annular space providing selective discharge from said outer cylinder chamber, a resilient annular valve seal fixed to the reduced end of the plunger against the outer surface of the piston head and movable therewith, said piston head and said valve seal cooperating to close communication between said pump cylinder and discharge passage when said plunger is in said outer closure position, said outer end of said plunger closing communication between said pump cylinder and discharge passage when said plunger is in said inner closure position, said communication between said pump cylinder and said discharge passage being open when said plunger is intermediate said inner and outer closure positions, and resilient spring means normally urging said plunger to said outer position.

2. The structure defined in claim 1, wherein said elongated tubular body member comprises an elongated tubular shell, a displaceable cap element removably secured to and normally closing said one end, a second supplemental shell telescopically secured to and closing said other end, an inverted cup-like element having said axial passage therein, disposed intermediate said first shell and said supplemental shell, said cap element, first shell and cup-like element defining said reservoir, and said cup-like element and said supplemental shell defining said pump cylinder.

3. In a liquid dispenser, an elongated tubular body structure comprising an elongated tubular shell, a displaceable closure element removably secured to and normally closing one end of said tubular body structure, a supplemental second shell telescopically secured to and closing the other end of the tubular body structure and terminating in a reduced diameter elongated tubular portion having an axially disposed plunger bore therein, an inverted cup-like element disposed adjacent the junction of the first and second said shells and having a portion disposed therebetween and having an open restricted passageway therein, said closure element and first shell and cup-like element defining a liquid reservoir, said cup-like element and said second shell defining a pump cylinder, a plunger and piston assembly comprising a plunger slidably mounted in said plunger bore and working between an inner position and an outer closure position and a pump piston head fixed to the inner end of the plunger and disposed within the pump cylinder, said piston head being of substantially less diameter than the diameter of the pump cylinder and defining a flow passage between the inner and outer pump cylinder chambers on opposite sides of the piston head during working movements of the piston, a generally outwardly directed restricted discharge passage through the second shell from the outer pump cylinder chamber and located radially outwardly of the plunger to provide selective discharge from said outer cylinder chamber, the plunger and piston assembly defining an annular valve seal surrounding the extreme inner end of the plunger and movable therewith to seat against said second shell radially outwardly of the opening of said restricted discharge passage from the outer pump cylinder chamber and closing communication between said pump cylinder and discharge passage when said plunger is in said outer closure position, said communication between said pump cylinder and said discharge passage being open when said plunger is intermediate said inner position and said outer closure position, and resilient spring means normally urging said plunger to said outer position.

References Cited in the file of this patent

UNITED STATES PATENTS

| | | |
|---|---|---|
| Re. 13,898 | Morrill | Apr 6, 1915 |
| 1,046,408 | Voges | Dec. 3, 1912 |
| 1,165,673 | Holmes | Dec 28, 1915 |
| 1,251,288 | Rogers | Dec 25, 1917 |
| 1,586,398 | Bobrick | May 25, 1926 |
| 1,699,237 | Goldrick | Jan. 15, 1929 |